Oct. 19, 1971          G. L. CONGER          3,613,324
DOOR SEAL UNIT
Filed May 12, 1969
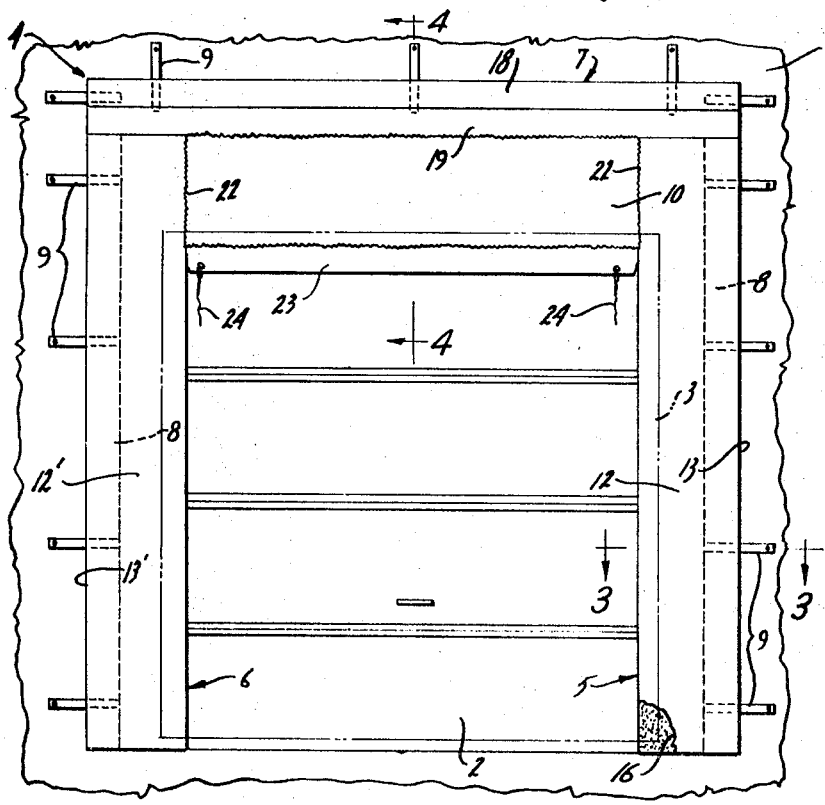
FIG_1
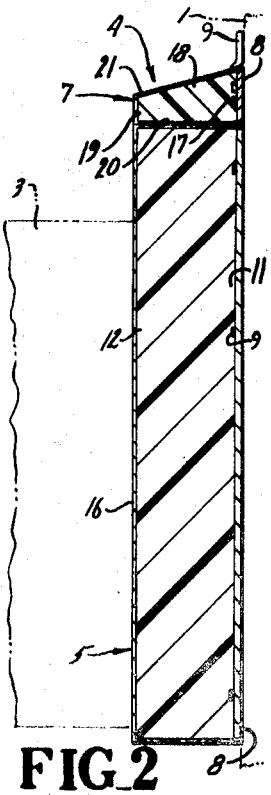
FIG_2
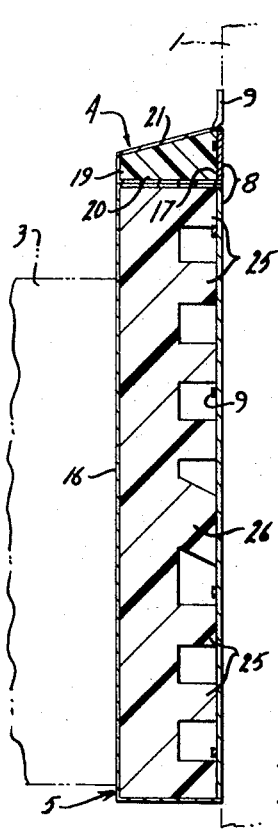
FIG_5
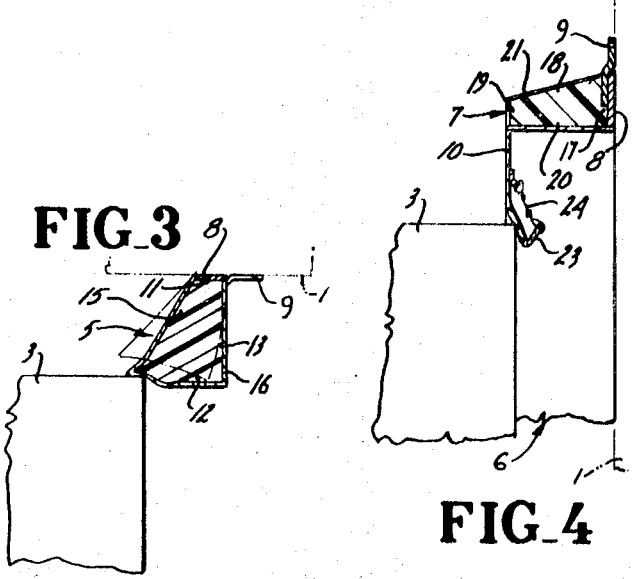
FIG_3
FIG_4
INVENTOR.
GARY L. CONGER
BY
Attorneys

United States Patent Office 3,613,324
Patented Oct. 19, 1971

3,613,324
DOOR SEAL UNIT
Gary L. Conger, 3043 W. Mason St.,
Green Bay, Wis. 54303
Filed May 12, 1969, Ser. No. 823,908
Int. Cl. E04h 14/00
U.S. Cl. 52—173
4 Claims

ABSTRACT OF THE DISCLOSURE

The seal unit of this disclosure includes a pair of similar side pads and a top pad formed of a polyurethane foam. Each side wall pad is formed of a tapered section having a relatively narrow base face secured to the adjacent exterior structure wall immediately adjacent an opening. An inner side face extends from the narrow end outwardly of the structure and inwardly of the space or opening between the pads to the outer edge portion of a wide sealing face defining a sealing lip portion. When the trailer is backed into abutting engagement, it engages the lip portions which deflect and form a weather-tight seal.

The top wall pad spans the sidewall pads and is also formed of tapered cross-section having a relatively deep mounting base and a slanting top surface to shallow front face. A fabric flap extends downwardly from the top pad between the two side wall pads to which it is secured. A drop flap is secured to the lower end of the first flap.

BACKGROUND OF THE INVENTION

This invention relates to a foam pad type door seal unit and particularly to such a seal unit which is adapted to be secured about an opening of a building structure to provide an abutting seal engaged by a truck trailer unit or the like to close the opening between the building structure and the trailer unit.

During the loading and unloading of truck trailers and the like, it is highly desirable to close the space between the building structure opening or doorway and the truck trailer from the outside environment. Various forms of foam pad structures have been suggested. Generally, they employ similar side pads and a top pad secured to the edge of the opening of the structure. The pads are made of a compressible resilient material such as solid blocks of polyurethane foam. The truck trailer is backed into abutting and compressing engagement with the sealing pad and thereby enclose the space between the door structure and the truck trailer. For example U.S. Pat. No. 3,461,627 to Gary Conger discloses a resilient foam pad structure secured to the building by a plurality of resilient foam mounting blocks or the like. The sidewall or edge pads have special central supporting structures, such as cable members between the top and bottom mounting pads. The mounting pad structure provides for a generally universal movement of the door sealing arrangement or units. Thus, if during the movement of the truck trailer into abutting engagement or during the loading and/or unloading there is any lateral, horizontal or vertical movement, or any tilting movement, the pad assembly can move as a unit with the truck-trailer thereby essentially eliminating the usual relative movement between the truck and the seal unit or front surfaces of the sealing pads.

SUMMARY OF INVENTION

The present invention is particularly directed to a door seal employing foam pad units or the like having an improved sealing means and permitting a relatively low cost construction. Generally, in accordance with the present invention the seal unit is formed with a pair of similar side pads. The pads are formed of a suitable compressible material such as the polyurethane foam and are interconnected to the sides of the structure opening. In accordance with the present invention each side wall pad is formed of a tapered section having a relatively narrow base or end face to be secured to the adjacent exterior structure wall immediately adjacent the opening. The side wall pad includes an outer wide end sealing face which is engaged by the trailer unit. The inner side face extends from the narrow end outwardly of the structure and inwardly of the space or opening between the pads to the outer edge portion of the sealing face. With the side wall pads attached to the opening the outermost ends thus generally define a lateral opening of the width less than the conventional truck trailer width. When the trailer is backed into abutting engagement, it engages the lip portions defined by the inner projection of the outer end portion of the side wall pads. The lip portions deflect inwardly with the truck as it moves slightly in between the pad structures and thus provides a very tight and reliable weather-tight seal.

In accordance with a preferred aspect of the present invention, a top wall pad spans the sidewall pads and is also formed of tapered cross-section. The top pad, however, is formed with a relatively wide or deep base face which is secured to the building structure. The top surface of the pad tapers or slants downwardly to the outer sealing or front edge which is formed as a relatively shallow or narrow front face. The structure is such that the top pad is disposed above the normal level of the truck-trailer unit. A fabric flap member is secured to the forward end of the top pad and extends downwardly between the two side wall pads. The edges of the flap are preferably secured by a lacing or other means to the adjacent fabric cover for the side wall pads. In a preferred construction, the laced flap provided includes a drop flap secured to the lower edge thereof for selective dropping into engagement with the top wall of the truck or trailer unit.

The several side and/or top pads may each be formed as a solid pad, generally in accordance with the well known pad construction. Alternately, it may be constructed with the universal mounting block of the previously referred to Conger patent. In addition, applicant has found that a foam pad, such as shown in the Conger patent may advantageously include an improved mounting construction wherein a plurality of mounting pads are provided along the complete depth of the side wall pads. The mounting pads are vertically spaced to provide direct support for the sealing pad, thereby eliminating the necessity of the special internal supporting cables or the like. One or more of the central mounting pads preferably extend downwardly from the sealing pad to the building structure to provide an improved vertical support for the central portion of the pad.

The drawing furnished herewith illustrates the best mode presently contemplated by the inventor for carrying out the subject invention and clearly discloses the above advantages and features as well as other that will be readily understood from the following description of the preferred constructions.

BRIEF DESCRIPTION OF DRAWING

In the drawing:

FIG. 1 is a front elevational view of a seal unit attached to a building constructed in accordance with the present invention;

FIG. 2 is a side sectional view of the door seal shown in FIG. 1 with a fragmentary portion of a truck-trailer shown in abutting engagement;

FIG. 3 is a horizontal section taken generally on line 3—3 of FIG. 1 and showing the horizontal cross section of the side wall pads as shown in FIG. 1;

FIG. 4 is a vertical section taken generally along line 4—4 of FIG. 1, and illustrating the cross section of the top wall pad; and FIG. 5 is a view similar to FIG. 2 with parts broken away in section to show the alternate support construction for a foam door seal pad.

DESCRIPTION OF ILLUSTRATED EMBODIMENTS

Referring to the drawings and particularly to FIGS. 1 and 2, the present invention is shown applied to a building structure 1, such as a warehouse or other storage structure, having a loading transfer doorway or opening 2, raised above the usual ground level. A truck van or trailer 3 is adapted to be aligned with the opening 2 for purposes of transferring goods between the trailer 3 and the building structure 1. A door seal unit 4 is secured to the building structure 1 about the opening 2. The truck trailer 3 moves into abutting engagement with the door seal unit 4 to provide a relatively weather-tight closure and sealing of the opening or space between the back of the truck trailer 3 and the building structure 1. Generally, in the illustrated embodiment of the invention, the door seal unit 4 includes a pair of similarly constructed side wall sealing pads 5 and 6 secured to the outer surfaces of the building structure 1 immediately adjacent the side walls or edges of the opening 2. The side wall pads 5 and 6 extend and are coextensive with the height of the opening. A top wall pad 7 is mounted immediately above the side walls 5 and 6 and spans the distance between the two sidewall pads 5 and 6 to provide a U-shaped seal about the edges and the top edge of the opening 2. In the illustrated embodiment of the invention, the sidewall pads 5 and 6 and the top wall pad 7 are mounted on wood mounting frame 8 having suitable mounting anchors 9 for interconnecting the assembly to the building structure 1. A fabric flap 10 is secured to the front end of the top wall pad 7 and hangs down between the sidewall pads 5 and 6 to below the normal top of the trailer 3. Thus, when the truck backs against the sidewall pads 5 and 6 to seal the side edges, it also engages the fabric flap 10 to provide a top wall seal.

The present invention is particularly directed to the construction of the sealing pads. Each of the sidewall pads 5 and 6 is similarly constructed and consequently sidewall pad 5 will be described in detail, the corresponding elements of the sidewall pad 6 being identified by similar primed numbers.

The sidewall pad 5 is shown as a solid member formed of a suitable resiliently compressible material; for example, polyurethane foam. The sidewall pad 5 is formed with a tapered cross section including a narrow base face 11 secured to the frame 8 and thereby to the building structure 1 immediately adjacent the edge of the opening 2. The pad 5 enlarges as it moves from the building terminating in an outer relatively planar sealing front face 12. The outer side surface or face 13 which joins the base face 11 and the sealing face 12 is a planar face generally perpendicular to the respective faces and thereby the building structure 1.

The pad 5 further includes a tapered inner face or surface 15 interconnecting the base face 11 and the sealing face 12. As a result the pad extends from the edge of the opening outwardly and inwardly laterally of the opening with the outermost portion defining a sealing lip portion gnerally extending inwardly of the opening 2. The spacing between the sealing lip portions of the sealing pads 5 and 6 is such that the opening therebetween is somewhat less than the width of the regular or conventional truck-trailer.

The foam pads 5 and 6 are similarly encased in a wear resistant protective cover 16 formed of a suitable fabric or the like. In addition, the front face 12 may be provided with one or more additional wear resistant fabric strips. Thus, when the truck-trailer 3 moves backwardly into sealing engagement with the pads 5 and 6, it generally engages the inwardly projecting sealing lip portions. The truck trailer 3 may then actually move slightly inwardly between the sidewall pads 5 and 6 with the sealing lip portions deflecting inwardly, with some sealing compression of the foam pads, to establish a weather-tight seal between the sidewall portions of the truck-trailer and the sealing pads 5 and 6.

The top pad 7 is similarly constructed of a compressible foam material or other suitable material and is also formed with a generally tapered construction.

The top pad 7, however, includes a relatively deep or wide mounting base portion or face 17 interconnected by the frame 8 to the building structure 1. The top wall or surface 18 of the pad 7 slants downwardly to a relatively narrow or shallow front face 19. The bottom face 20 extends generally perpendicular to the building structure 1. The pad 7 includes an outer protective fabric cover 21.

A sheet-like flexible flap 10 formed of a suitable fabric such as canvas or the like, is integrally interconnected to the top wall cover or separately formed and connected thereto as by lacing. The flap 10 has a width generally somewhat greater than the opening between the outermost front faces of the side wall pads 5 and 6 and hangs downwardly therebetween. The side edges of the flap 10 are interconnected to the adjacent inner side edges of the side pads 5 and 6 as by a lacing 22 or the like. An additional sealing flap 23 is integrally formed with the lowermost edge of the flap 10 or separately formed and connected thereto in a suitable manner. Ropes 24 are connected to lower corners of flap 23 for selectively securing the drop flap 23 upwardly behind the top flap 10.

When the truck trailer 3 is backed into deflecting sealing engagement with the special sidewall pads the pads the flap 10 will be engaged by the truck trailer or be spaced slightly above it. If it is engaged by the truck trailer it provides a direct seal. If it is slightly above it, the drop flap 23 is released and drops down onto the truck trailer to provide a weather tight seal along the upper edge.

Applicant has found that the illustrated embodiment of the invention provides a relatively inexpensive and reliable tight seal about a truck trailer or the like having exceptionally long life, with a better seal than that obtained with the conventional solid rectangular foam pad.

FIG. 5 illustrates a possible modification to the mounting of a foam pad such as shown in FIGS. 1 and 4 employing an improved universal mounting such that the total unit can move with the truck structure, if so desired. Generally, as a practical matter applicant has not found such a construction necessary and it is illustrated herein to show a possible further improved alternative construction. The structures of FIG. 5 generally correspond to the patent structure shown in FIGS. 1–4 and consequently corresponding elements are similarly numbered for simplicity and clarity.

In FIG. 5, the sidewall pad 5 is similarly constructed with a tapered cross section. The pad 5 of FIG. 5 however, includes a plurality of rearwardly projecting mounting blocks 25 vertically spaced throughout the length or depth of the pad 5. In the illustrated embodiment of the invention, the blocks 25 are formed by recesses in the backside of the pad structure to provide a continuous integral support. The front portion and the blocks may be separately formed and interconnected to the mounting pad in any desired manner.

The center mounting block 26 of the blocks 25 is preferably formed with a somewhat heavier or larger cross section. Furthermore, it slants downwardly from the front sealing pad portion to the attachment face. The downward slanted construction assists in the physical supporting of the unit and thereby minimizes the sagging of the pad structure.

The present invention thus provides an improved pad-type seal unit which can be economically constructed, readily applied to a building structure and provide a long life and a reliable door seal.

I claim:

1. A door seal unit for sealing the space between a door opening in a structure and a conveyance, comprising a pair of laterally spaced sidewall pads formed of a resiliently compressible material, each of said pads including a narrow mounting base face which is adapted to be secured to the structure with one pad adjacent each of the opposite sides of the opening, each of said pads including a relatively wide outer sealing lip portion extending inwardly of said base face toward the opposite pad and defining an opening between said sealing lip portions of a width less than the opening between said base faces, a plurality of vertically spaced mounting block members of a resiliently compressible material secured to each base face and projecting rearwardly therefrom for securing said pad to said structure and supporting said pad in spaced relation to said structure and said plurality of mounting block members including a center block member, said block members permitting the forced movement of said pad relative to the structure to accommodate vertical and horizontal movement of a conveyance in sealing engagement with said pad.

2. The door seal unit of claim 1 wherein each of said pads includes an inner tapered side planar face extending from said mounting block members to the outer exterior wall of said sealing lip portion.

3. The door seal unit of claim 1 having a top wall pad formed of resiliently compressible material and including a deep mounting base face adapted to be secured to the structure immediately above said sidewall pads for spanning the door opening, the top surface of the top wall pad tapering downwardly to a relatively narrow front face in the outer plane of said sealing portion, a flexible fabric flap connected to said top wall pad and depending downwardly below said top wall pad between said sidewall pads, a lacing interconnecting the outer edges of the flap to the front inner edge of the adjacent sidewall pads, and a drop flap secured to the lower edge of the fabric flap and fully depending therefrom with unattached sides and bottom edges.

4. The door seal unit of claim 1 wherein said center block member extends downwardly from said mounting base face.

References Cited

UNITED STATES PATENTS

| | | | |
|---|---|---|---|
| 2,704,574 | 3/1955 | Etlar | 52—204 |
| 3,220,062 | 11/1965 | Aermann | 52—211 X |
| 3,230,675 | 1/1966 | Frommelt et al. | 52—204 |
| 3,286,417 | 11/1966 | Dazzo | 49—475 X |
| 3,375,625 | 4/1968 | Edkins et al. | 52—204 |
| 3,403,489 | 10/1968 | Frommelt et al. | 52—204 |
| 3,461,627 | 8/1969 | Conger | 52—173 X |
| 3,500,599 | 3/1970 | Sciolino | 52—204 X |
| 2,061,263 | 11/1936 | Wells | 52—211 |

FRANK L. ABBOTT, Primary Examiner

S. D. BURKE, Assistant Examiner

U.S. Cl. X.R.

52—204; 49—475